United States Patent [19]

Sakakihara et al.

[11] Patent Number: 4,540,638
[45] Date of Patent: Sep. 10, 1985

[54] NON-MAGNETIC SUBSTRATE MATERIAL

[75] Inventors: Masahiko Sakakihara, Kumagaya; Kenzi Hasegawa, Saitama; Akira Iwama, Katsuta, all of Japan

[73] Assignees: Hitachi Metals, Ltd.; Hitachi, Ltd., both of Tokyo, Japan

[21] Appl. No.: 591,592

[22] Filed: Mar. 20, 1984

[30] Foreign Application Priority Data

Mar. 22, 1983 [JP] Japan ................. 58-47597

[51] Int. Cl.$^3$ .................................. B32B 15/00
[52] U.S. Cl. .................. 428/693; 423/594; 423/599; 428/469; 428/900; 501/1; 501/153
[58] Field of Search .......... 501/1, 153; 428/469, 428/693, 900; 423/594, 599

[56] References Cited

U.S. PATENT DOCUMENTS 3,380,919  4/1968  Wickham .................. 423/599

FOREIGN PATENT DOCUMENTS 52-126797  4/1977  Japan .
53-16399   2/1978  Japan .................. 423/599

Primary Examiner—Howard S. Williams
Assistant Examiner—Terryence Chapman
Attorney, Agent, or Firm—Finnegan, Henderson, Farabow, Garrett & Dunner

[57] ABSTRACT

A thin film magnetic material assembly for a magnetic head which has a non-magnetic substrate material and a magnetic metallic film vapor deposited thereon. The substrate material has a thermal coefficient of expansion approximating that of the magnetic metallic film. The substrate has a NaCl lattice structure and a composition represented by the formula $Ni_xMn_{2-x}O_2$ where $0.25 \leq x < 1$. The substrate can optionally contain not more than 10% by weight of at least one of the group Al, Cr, Si, Sn, Ba as a secondary component. The magnetic metallic film most suitable in connection with the present invention is Fe-Ni, Fe-Al-Si or similar based alloys.

6 Claims, No Drawings

NON-MAGNETIC SUBSTRATE MATERIAL

BACKGROUND OF THE INVENTION

This invention relates to an improvement in a non-magnetic substrate material for use in depositing crystalline or non-crystalline magnetic metallic films of Fe-Ni, Fe-Al-Si, etc.-based alloys.

In the production of, for example, film-form magnetic heads, integrated circuit elements, etc., a process has been used, which comprises applying a smooth surface finishing to a non-magnetic substrate material such as barium titanate, calcium titanate, alumina, zinc ferrite, glass or the like, washing the non-magnetic substrate material in an organic solvent such as trichloroethylene, acetone or the like, forming a magnetic metallic film of Fe-Ni or Fe-Al-Si-based alloy on the non-magnetic substrate material to a film thickness of a few to several tens $\mu$m by a well known physical vapor-deposition technique such as vacuum vapor deposition, sputtering, ion plating, etc., and then heat-treating the substrate in vacuum at 500°–700° C. to improve the magnetic properties.

However, this conventional process has problems such as peeling of the magnetic metallic film during the heat treatment. Most conventional substrate materials have considerably different thermal expansion coefficients ($\alpha$) than that of the magnetic metallic film. Thus the vapor-deposited magnetic metallic film is liable to peel off during the heat treatment for improving the magnetic properties. When a glass with a thermal expansion coefficient approximating to that of a magnetic metallic film is used as a substrate material peeling of the vapor-deposited film is less of a problem. Glass, however, is not always completely compatible with the vapor-deposited film, and thus there is still a problem in bonding strength. In addition, when a film form magnetic head is made from a glass substrate, the substrate wears by attrition caused by sliding between the head and a magnetic tape due to a low hardness of glass.

Thus, it has been desired to develop a non-magnetic substrate material having a thermal expansion coefficient approximating to that of a magnetic metallic film of Fe-Ni, Fe-Al-Si, etc. based alloys ($\alpha_T = 120-150 \times 10^{-7}$/°C.) and a hardness approximating that of magnetic powder contained in magnetic tapes ($H_v = 500-700$ Kg/mm$^2$).

SUMMARY OF THE INVENTION

An object of the present invention is to provide a non-magnetic substrate material suitable for forming a crystalline or non-crystalline magnetic metallic film of Fe-Ni, Fe-Al-Si, etc.-based alloys thereon by a physical vapor-deposition technique that is effectively bonded and attrition resistant.

To attain the said object, the present invention characteristically uses a non-magnetic oxide material having a NaCl type lattice structure having the general formula, Ni$_x$Mn$_{2-x}$O$_2$, wherein $0.05 \leq x \leq 1$, as a substrate material for receiving a magnetic metallic film by vapor deposition.

The oxide material was disclosed by the present applicants as a structural material relating to bonding with ferrite in the production of ferrite magnetic head (Japanese Patent Application Kokai (Laid-open) No. 52-126797). That application was directed to the characteristics as a structural material for a magnetic head, and it was not clear whether the oxide material was or was not suitable for a substrate material for vapor-depositing a magnetic material film thereon.

As a result of extensive studies to develop novel materials for solving the problems of the prior art, the present inventors have found that the non-magnetic material of the stated structure is particularly suitable for a substrate material for depositing a magnetic metallic film of Fe-Ni, Fe-Al-Si, etc. -based alloys.

According to the present invention, x in the general formula for the primary composition is set to $0.05 \leq x \leq 1$, because the thermal expansion coefficient $\alpha_T$ becomes $120-150 \times 10^{-7}$/°C., which approximates to the thermal expansion coefficient $\alpha_T$ of a magnetic metallic film of Fe-Ni, Fe-Al-Si, etc. -based alloys, in the stated ranged for x.

When the primary composition further contains at least one of Al, Cr, Si, Sn, Ba, etc. as a secondary component in the present invention, a high density can be obtained. That is, a more preferable substrate material can be obtained by adding thereto at least one of Al, Cr, Si, Sn, Ba, etc., so long as $\alpha_T$ of the resulting substrate can be approximate to the $\alpha_T$ of a magnetic metallic film of Fe-Ni, Fe-Al-Si, etc. -based alloys. It is desirable to add not more than 10% by weight, preferably 0.5–5% by weight of at least one of these secondary components to the primary composition on the basis of the primary composition.

The present invention will be described in detail below, referring to an Example.

PREFERRED EMBODIMENTS OF THE INVENTION

EXAMPLE

Raw materials MnCO$_3$ and NiO were weighed out to prepare 500 g each of non-magnetic oxide materials represented by the general formula, Ni$_x$Mn$_{2-x}$O$_2$ for $x = 0.05, 0.6, 0.8$ and $1.0$. The raw materials were mixed and pulverized in acetone in a ball mill for 10–20 hours. The mixing and pulverizing can be also carried out in water or other organic solvents such as alcohol, etc. 4% by weight of Al$_2$O$_3$ was added to the primary composition with $x = 0.6$ during the pulverization and treated in the same manner as above.

All these mixtures were each calcined at 700°–1,200° C. molded, and sintered at a temperature of 1,150°–1,300° C. in a nitrogen gas atmosphere. The resulting materials were analyzed by x-rays, and found to have a NaCl lattice structure. From these materials substrates were prepared with a shape of 20 mm long, 10 mm wide and 2 mm thick and a smooth surface-finishing on one side. A magnetic metallic film of Fe-Ni-based alloy (Permalloy film) or a magnetic metallic film of Fe-Al-Si-based alloy (Sendust film) was formed each on the surface-finished side of the materials to a thickness of about 5 $\mu$m by sputtering. The resulting materials were heat-treated in a vacuum furnace at 600° C. for 10 minutes, and furnace cooled.

The characteristics of the thus obtained materials are shown in the Table, where a material prepared on a substrate material of barium titanate ceramic in the same manner as above is shown as the prior art material for comparison.

TABLE

| material | $\alpha_T$ | $H_V$ | Film peeling Permalloy | Sendust |
|---|---|---|---|---|
| A (x = 1.0) | 130 × | 600 Kg/mm$^2$ | none | none |

TABLE-continued

| material | $\alpha_T$ | $H_V$ | Film peeling Permalloy | Sendust |
|---|---|---|---|---|
| B (x = 0.8) | $135 \times 10^{-7}/°C.$ | 550 Kg/mm² | none | none |
| C (x = 0.6) | $140 \times 10^{-7}/°C.$ | 500 Kg/mm² | none | none |
| D (x = 0.05) | $120 \times 10^{-7}/°C.$ | 300 Kg/mm² | none | none |
| E* (x = 0.6) | $142 \times 10^{-7}/°C.$ | 550 Kg/mm² | none | none |
| Prior art | $95 \times 10^{-7}/°C.$ | 900 Kg/mm² | swollen | swollen |

Remark:
*4% by weight of Al₂O₃ added

As is obvious from the above Table, no peeling took place with the materials according to the present invention during the heat treatment of the magnetic metallic film in contrast to the prior art material. The material further containing $Al_2O_3$ as the secondary component had an $\alpha_T$ of $142 \times 10^{-7}/°C.$ and was obviously an effective and useful substrate material with a very high density as an additional advantage.

With the present non-magnetic substrate material a magnetic metallic film, from which a heat treatment is desirable for improving the magnetic characteristics after the formation of a magnetic metallic film, can be heat-treated, without any fear of film peeling. As a result electronic parts or elements with a film having good magnetic characteristics can be produced effectively.

The foregoing description is made only of a magnetic metallic film of Fe-Ni or Fe-Al-Si-based alloy, but it is needless to say that the present invention is not limited only to such applications, but also is applicable as a substrate material for crystalline or non-crystalline magnetic metallic films of other compositions, so long as they have the similar thermal expansion coefficients. The present substrate material with a physically vapor-deposited magnetic metallic film is applicable not only to film form magnetic heads, but also to other electronic parts, for example, integrated circuits, etc.

What is claimed is:

1. A thin film magnetic assembly for a magnetic head, said assembly comprising a non-magnetic substrate material and a magnetic metallic film vapor-deposited on the substrate material, wherein the substrate material has a thermal expansion coefficient approximating that of the magnetic metallic film, a NaCl-type lattice structure and a nickel-manganese oxide composition represented by the formula:

$$Ni_xMn_{2-x}O_2$$

wherein $0.05 \leq x < 1$, said composition optionally containing not more than 10% by weight of at least one individual element of the group consisting of Al, Cr, Si, Sn and Ba as a secondary component on the basis of said nickel-maganese oxide.

2. The thin film magnetic assembly as set forth in claim 1, wherein the secondary component comprises Al.

3. The thin film magnetic assembly of claim 1, wherein the secondary component is an oxide of the individual elements.

4. The thin film magnetic assembly of claim 3, wherein the oxide is $Al_2O_3$.

5. The thin film magnetic assembly of claim 1, wherein the substrate material has a thermal expansion coefficient of $120-150 \times 10^{-7}/°C.$ 6. The thin film magnetic assembly of claim 5, wherein the magnetic metallic film comprises an Fe-Ni based alloy or an Fe-Al-Si based alloy.

* * * * *